US010959092B2

(12) United States Patent
Sharma et al.

(10) Patent No.: US 10,959,092 B2
(45) Date of Patent: Mar. 23, 2021

(54) METHOD AND SYSTEM FOR PAIRING WIRELESS MOBILE DEVICE WITH IOT DEVICE

(71) Applicant: Aeris Communications, Inc., San Jose, CA (US)

(72) Inventors: Narendra Sharma, Sunnyvale, CA (US); Eran Netanel, Belmont, CA (US); Yixiang Chen, Palo Alto, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 16/601,852

(22) Filed: Oct. 15, 2019

(65) Prior Publication Data

US 2020/0120500 A1 Apr. 16, 2020

Related U.S. Application Data

(60) Provisional application No. 62/746,137, filed on Oct. 16, 2018.

(51) Int. Cl.
*H04W 12/04* (2009.01)
*H04W 12/00* (2009.01)
(Continued)

(52) U.S. Cl.
CPC ..... *H04W 12/04033* (2019.01); *H04W 8/005* (2013.01); *H04W 12/001* (2019.01);
(Continued)

(58) Field of Classification Search
CPC ......... H04W 12/04033; H04W 12/003; H04W 8/005; H04W 12/001; H04W 12/0401; H04W 76/14; H04W 12/02
See application file for complete search history.

(56) References Cited

U.S. PATENT DOCUMENTS 9,064,101 B2 6/2015 Bruce et al.
10,187,793 B2 1/2019 Petel
(Continued)

FOREIGN PATENT DOCUMENTS

WO 2017007725 A1 1/2017
WO 2017101729 6/2017
(Continued)

OTHER PUBLICATIONS

I. Ali, "Internet of Things Security, Device Authentication and Access Control: A",https://arxiv.org/ftp/arxiv/papers/1901/1901.07309.pdf retrieved Aug. 1, 2019, Aug. 2016.
(Continued)

*Primary Examiner* — Marisol Figueroa
(74) *Attorney, Agent, or Firm* — Brundidge & Stanger, P.C.

(57) ABSTRACT

A computer-implemented method and system for pairing one or more source devices with at least one target device are disclosed. The computer implemented method for pairing one or more source devices with at least one target device, the method includes receiving device identifiers for the one or more source devices and the at least one target device; generating pairing resource for at least one of the one or more source devices and the at least one target device; and using the pairing resource to allow authenticated and authorized users to perform a remote operation on the at least one target device from the at least one of the one or more source devices.

27 Claims, 9 Drawing Sheets

(51) Int. Cl.
*H04W 8/00* (2009.01)
*H04W 76/14* (2018.01)

(52) U.S. Cl.
CPC ..... *H04W 12/003* (2019.01); *H04W 12/0401* (2019.01); *H04W 76/14* (2018.02)

(56) References Cited

U.S. PATENT DOCUMENTS

| | | | |
|---|---|---|---|
| 10,289,288 B2 | 5/2019 | Penilla et al. | |
| 10,343,649 B2 | 7/2019 | Britt et al. | |
| 2012/0331287 A1 | 12/2012 | Bowman et al. | |
| 2014/0079217 A1* | 3/2014 | Bai | H04L 63/0869 380/270 |
| 2015/0045013 A1* | 2/2015 | Simmons | G07C 5/008 455/420 |
| 2016/0150350 A1 | 5/2016 | Abhimanyu et al. | |
| 2016/0182459 A1 | 6/2016 | Britt et al. | |
| 2017/0208432 A1* | 7/2017 | Britt | H04L 63/06 |
| 2018/0191889 A1 | 7/2018 | Gerhardt et al. | |

FOREIGN PATENT DOCUMENTS

| | | |
|---|---|---|
| WO | 2017120243 A1 | 7/2017 |
| WO | 2018160863 | 9/2018 |

OTHER PUBLICATIONS

Weijia He et al., "Rethinking Access Control and Authentication for the Home Internet of Things (IoT)", https://www.usenix.org/system/files/conference/usenixsecurity18/sec18-he.pdf retrieved Aug. 1, 2019, Aug. 2018.

Arlene Mordeno et al., "Identity and Access Management for the Internet of Things—Summary Guidance" https://downloads.cloudsecurityalliance.org/assets/research/internet-of-things/identity-and-access-management-for-the-iot.pdf retrieved Aug. 1, 2019, Dec. 2016.

International Search Report and Written Opinion from International Application No. PCT/US2019/056217 dated Feb. 3, 2020.

* cited by examiner

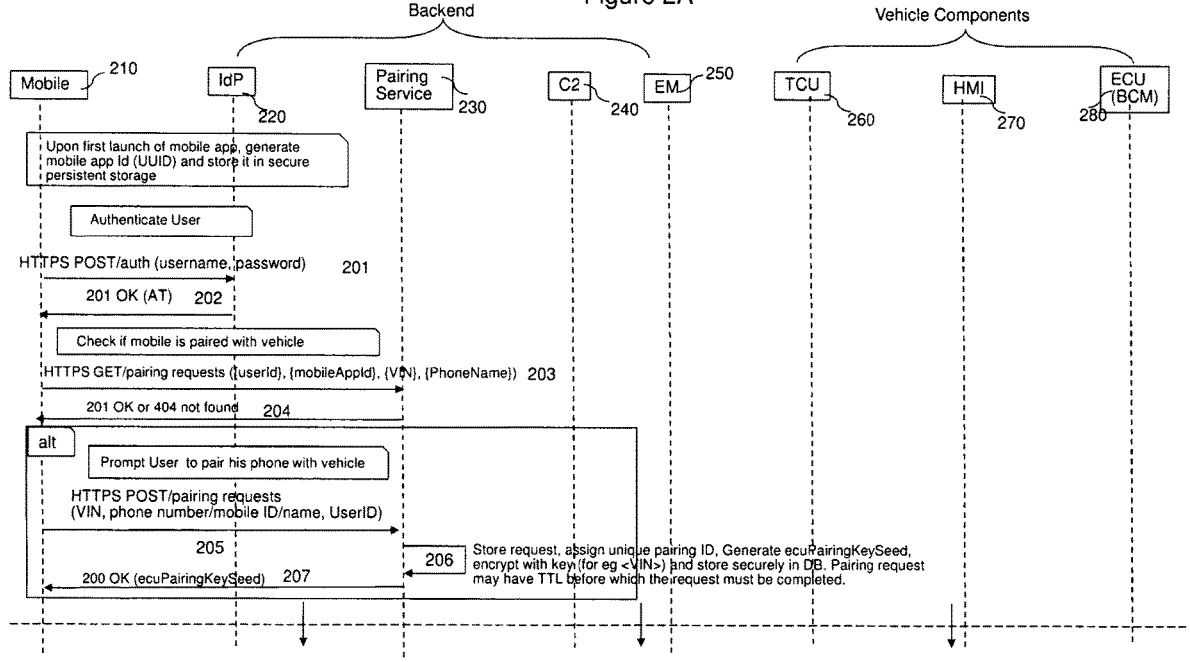

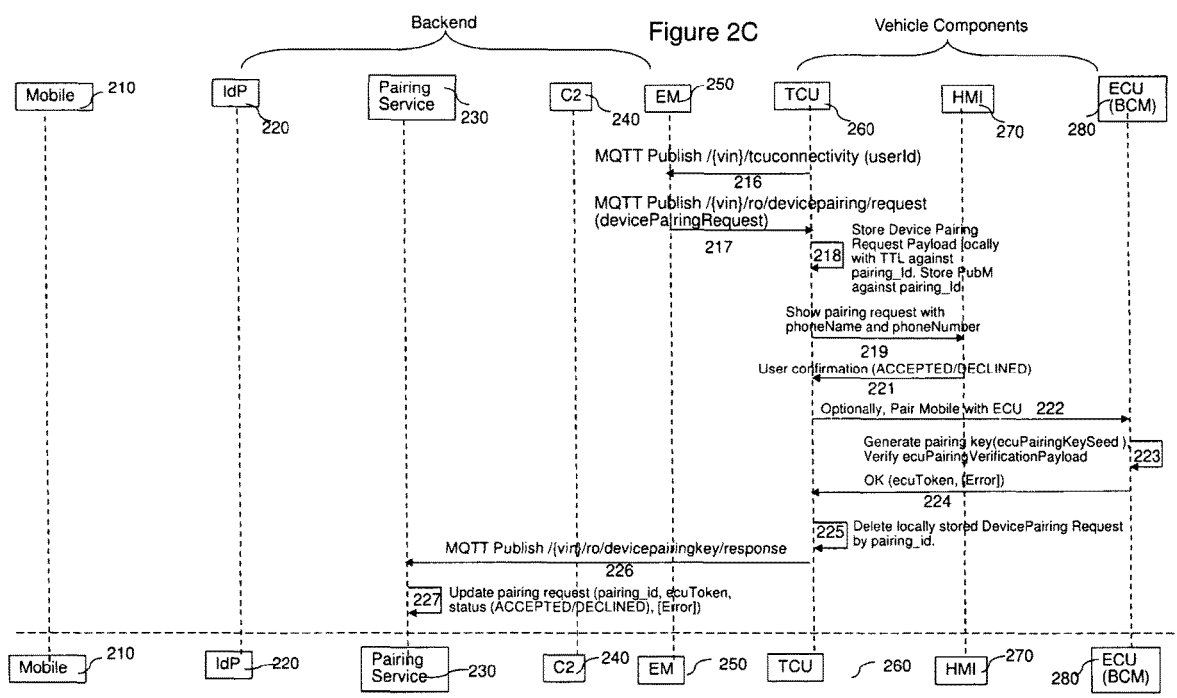

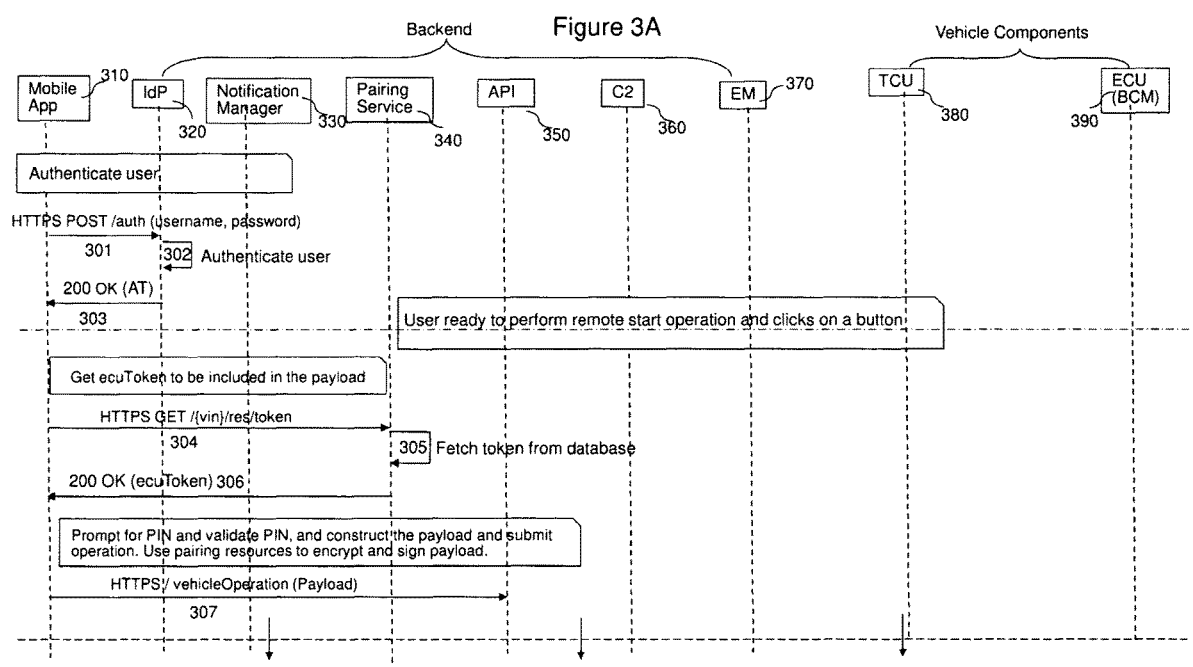

METHOD AND SYSTEM FOR PAIRING WIRELESS MOBILE DEVICE WITH IOT DEVICE

CROSS-REFERENCE TO RELATED APPLICATIONS

Under 35 USC 119(e), this application claims priority to U.S. provisional application Ser. No. 62/746,137, filed on Oct. 16, 2018, which is herein incorporated by reference in its entirety.

FIELD OF THE INVENTION

The present invention relates generally to cellular or other wireless networks and more particularly to mobile devices capable of sending remote commands to IoT devices capable of receiving remote commands via cellular or other wireless networks.

BACKGROUND

Many Internet-of-Things (IoT) Machine-to-Machine (M2M) devices receive commands remotely from mobile devices such as mobile phones or tablets capable of sending remote commands via cellular or other wireless networks. Public and governmental concern is growing over security lapses by network operators, device manufacturers or service providers that allow unauthorized access to and control of such IoT devices. An additional set of security processes built specifically to address this remote operation of IoT devices and implemented by a network operator or service provider may prevent unauthorized remote operation of the IoT devices.

SUMMARY

In one or more embodiments, a computer-implemented method, a system and computer program product for securely pairing one or more source devices with at least one target device to enable remote operations from trusted, paired devices are disclosed.

The computer implemented method for securely pairing one or more source devices with at least one target device includes receiving device identifiers for the one or more source devices and the at least one target device; generating pairing resource for at least one of the one or more source devices and the at least one target device; and after successful pairing using the pairing resource to allow authenticated and authorized users to perform a remote operation on the at least one target device from the at least one of the one or more paired source devices.

The system for pairing one or more source devices with at least one target device comprises at least one server comprising a processor and a storage database; one or more source devices; and at least one target device; wherein the at least one server receives device identifiers for the one or more source devices and the at least one target device, and generates a pairing resource for at least one of the one or more source devices and the at least one target device; after successful pairing, allows authenticated and authorized users to perform a remote operation on the at least one target device from the at least one of the one or more paired source devices using commands that are securely encrypted and/or signed by means of the generated pairing resource.

The computer program product stored on a non-transitory computer readable medium for pairing one or more source devices with at least one target device; the computer program product includes a processor, and a memory in communication with the processor wherein the memory containing program instructions which when executed by the processor, perform the following operations including receiving device identifiers for the one or more source devices and the at least one target device; generating pairing resource for at least one of the one or more source devices and the at least one target device; and using the pairing resource to allow authenticated and authorized users to perform a remote operation on the at least one target device from the at least one of the one or more source devices.

BRIEF DESCRIPTION OF THE DRAWINGS

FIGS. 2A, 2B and 2C illustrate an exemplary process for pairing source devices with IoT devices capable of receiving remote operation commands by providing secure authentication according to an embodiment described herein FIGS. 3A, 3B and 3C illustrate an exemplary process for performing remote operations using paired source devices with IoT devices capable of receiving remote operation commands by providing secure authentication according to an embodiment described herein.

DETAILED DESCRIPTION

Figure 1A:
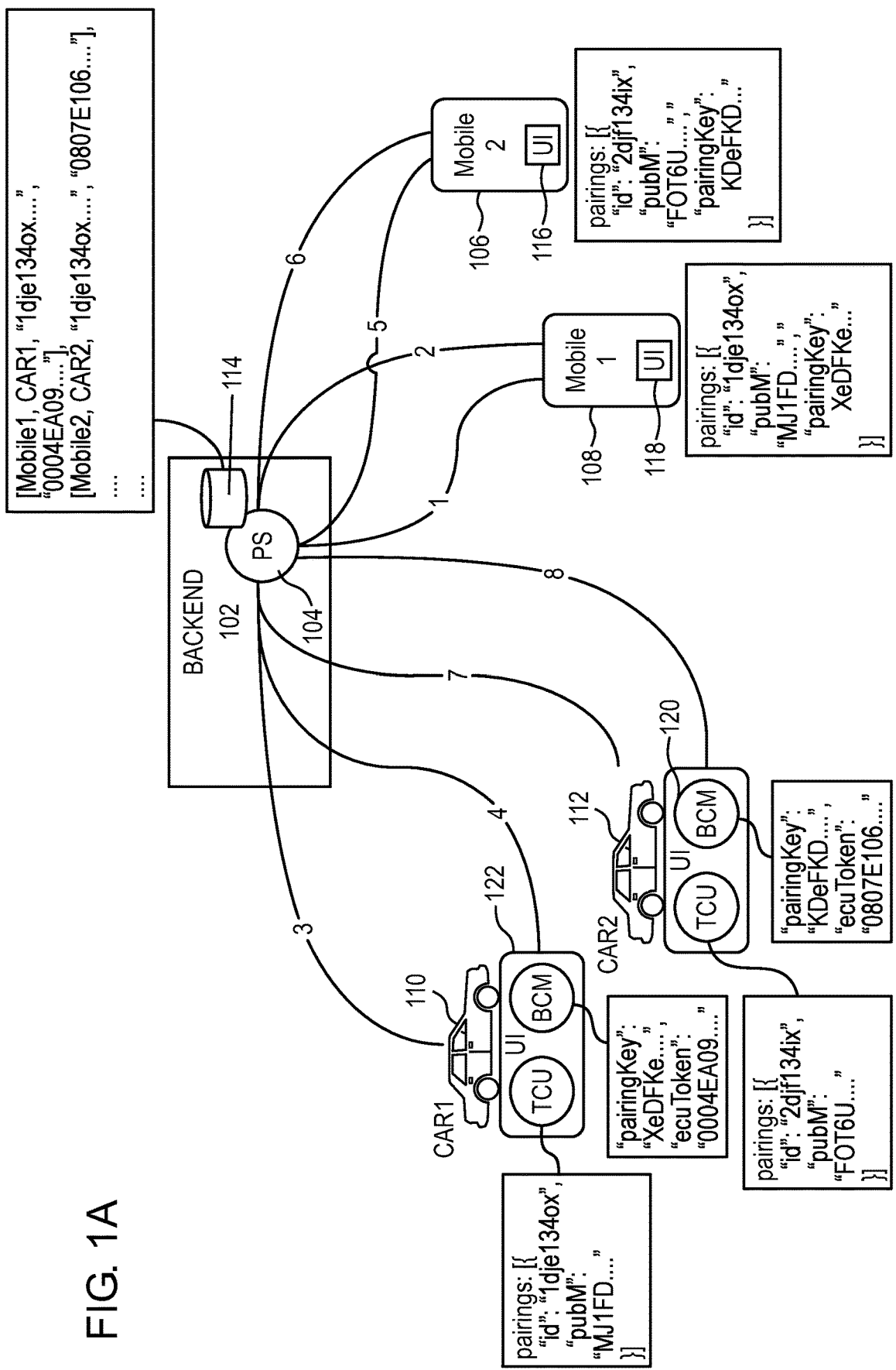
FIG. 1A illustrates a diagram for an exemplary system for securely pairing a source device with IoT devices capable of receiving remote operation commands by providing secure authentication according to an embodiment described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present invention relates generally to cellular or other wireless networks and more particularly to mobile or other personal devices capable of sending remote commands to IoT devices capable of receiving remote commands via cellular or other wireless network.

Many Internet-of-Things (IoT)/Machine-to-Machine (M2M) devices receive commands remotely from mobile or personal devices such as mobile phones, tablets or personal assistant or home control devices, e.g., Google Home or Amazon Alexa, capable of sending remote commands to these IoT devices via cellular or other wireless networks. An additional set of security processes built around this remote operation of IoT devices, for example, cloud mediated remote operation of IoT devices, and implemented by a network operator or service provider may prevent an unauthorized remote operation of the IoT devices by providing secure authentication of devices sending remote commands.

One such example of IoT devices is connected vehicles, which are capable of receiving and executing the remote commands from mobile or other personal devices capable of sending those remote commands via a cellular or wireless network, for example, cloud mediated remote commands. One of the features in many connected vehicle solutions is the ability to perform operations remotely, such as door lock/unlock, engine start, honk and flash, etc. However, some of these operations, such as remote engine start and remote door lock, may benefit from additional security processes intended to prevent crimes or accidents, such as preventing unauthorized users from sending remote commands to vehicles or preventing even authenticated users from issuing remote commands in certain situations.

Traditionally, the security of remote operations is addressed by user authentication and authorization functions. These may not be sufficient if the malicious user is an internal user or a user who may have access to devices or to parameters involved in authentication and authorization, e.g., username and password. Similarly, the authentication and authorization functions may not be helpful, such as when two separate authorized users send remote commands through separate devices (transmitting devices/source devices) e.g., mobile phones, or user commands are transmitted unintentionally by an authorized user to the wrong receiving or target device, e.g., connected vehicle.

For example, a husband and wife may drive the same car and both may be authorized users of that car. However, one of them, through their mobile phone, may unintentionally send a remote command to the car, which the other may be using at the time. Such unintentional transmission of commands may result in unintended consequences including accidents, if the car acts on that remote command because it is received from an authorized user.

One of the ways to effectively address this issue is to allow these "protected" or specific remote operations from certain devices/mobiles only. The protected or specific remote operations may be defined as the operations, if performed may result in hazardous situations or may result in injury to the user of the target device or to others, e.g., remote engine start/stop, remote door lock/unlock etc. Pairing of wireless mobile device with IoT device also known as Mobile-Device Pairing refers to the process of using cryptographical techniques to pair IoT devices capable of receiving remote commands (receiving devices/target devices) with specific mobile or other personal devices capable of sending the remote commands (transmitting devices/source devices) to the IoT devices so that the IoT device may only execute commands coming from known/paired devices. The process of using cryptographical techniques to pair receiving devices with specific transmitting devices may also be used in other domains like home internet by allowing authorized users to control access to internet by other users only through authorized or paired devices or allowing authorized users to control access to certain functions of devices or access to certain devices by other users only through authorized or paired devices.

Pairing of wireless mobile device with IoT device also known as Mobile-Device Pairing is a safety and security function. It ensures that the requests for protected functions like Remote Engine Start (RES) and Remote Door Unlock (RDL) on a target device are requested from trusted mobile phones or other source devices. Different levels of protection may be provided: 1. User Authentication, where remote commands from authenticated users result in the operations irrespective of the source device. 2. User Authorization, where remote commands from authenticated users that are authorized result in the operations irrespective of the source device. 3. Device Authorization, where remote commands sent by authenticated users that are authorized, sent from any authorized source device, result in the operations. 4. Device Authentication, where remote commands sent by authenticated users that are authorized, sent from a specific authorized source device can perform the operation.

Embodiments of the pairing of wireless mobile device with IoT device also known as Mobile-Device Pairing described herein specifically relate to protections provided by device authentication and device authorization methods described above. In an embodiment, the pairing of wireless mobile device with IoT device also known as Mobile-Device Pairing described herein refers to a cloud mediated pairing process to allow remote operations to be performed securely where the remote commands are also sent over cloud, providing a different approach from current technologies that use near field communication (NFC), for example, peer to peer (P2P) network used for exchanging data etc. Device authorization uses a process that generates a shared key, which is used to encrypt/decrypt data transferred to and from the device, also known as operation payload. The operation may be defined as the actual data that includes messages and/or commands to perform certain operations. An operation payload may be defined as the actual data included in the message as message body that is transferred without any meta data attached to that operation or headers that are attached to the message body. For example,

```
{
vehicleId:,
operation: "res",
requestTimestamp:,
userAgent:'
data:{
authPayload: <p4>,
PairingId:
   }
}
```

Where {vehicleId:, operation: "res", requestTimestamp:, userAgent:' is the header and data:{authPayload: <p4>, PairingId:} is the payload. Whereas device authentication uses a process that generates Public/Private key pair which is then used to sign and validate the data transferred to and from the device or operation payload. These processes are described in detail in the following paragraphs. The Public/Private key could be RSA (Rivest-Shamir-Adleman) or EC (Elliptic Curve) keys of varying sizes.

For device authorization a device platform generates a nonce and shares with the application running on source and target device. Both source and target devices use a predefined algorithm known only to the devices, e.g., Tiny Excryption Algorithm (TEA) or eXtended TEA (XTEA), to generate a symmetric shared key. Other algorithms that provide similar functionalities may also be used. A pairing service included in the device platform including identity service and authorization service (IdP) orchestrates the flow. Source device encrypts all payloads using the shared key and target device decrypts all payloads using the same key, for example, to pair ECUs (target device) within a vehicle with a mobile device.

Device Authentication: Source device generates Public/Private key pair. Source device shares Public Key with target device, which may also be known as a secret key. Target device saves public key or secret key in its secure store. In an embodiment, the secret key or the shared public key is saved only on the devices sharing that key. Alternatively, or additionally, the shared key or the secret may be shared in the storage database of the pairing service. Pairing service included in the device Platform, including identity service and authorization service (IdP), orchestrates the flow. Source device signs payloads using its private key. Target device validates signature using source device's public key, also known as the shared key or the secret key. Examples of signature algorithm may be RS256, RS384, RS512, ES256, ES384, ES512 or other secure asymmetric signing algorithm.

The following embodiments disclose, for example, a computer-implemented method, system and computer program product for pairing one or more source devices with at least one target device.

FIG. 1A is an overview diagram for an exemplary system for pairing a source device, such as a tablet or mobile phone to be used for requesting remote operation commands, with IoT devices capable of receiving the remote operation commands according to an embodiment described herein.

In an embodiment, the system for pairing one or more source devices with at least one target device comprises at least one server comprising a processor and a storage database in which the unique identities of one or more target devices and of one or more users (including at least one user identified as a primary user) and the source devices used by such users are stored; one or more source devices used by a primary or authorized secondary user; and at least one target device; wherein the at least one server receives a pairing request from a one or more source devices including device identifiers for the one or more source devices, e.g., Embedded Universal Integrated Circuit Card ID (eUICCId or EID or SIM ID), Mobile Station International Subscriber Directory Number (MSISDN). International Mobile Subscriber Identity (IMSI), International Mobile Equipment Identity (IMEI), Mobile Directory Number (MDN), Electronic Serial Number (ESN), which may be validated as under the control of an authorized primary or secondary user, and a device identifier associated with the at least one target device, e.g., EID, MSISDN, IMSI, IMEI, MDN, ESN, Vehicle Identification Number (VIN); generating a pairing resource for at least one of the one or more source devices and the at least one target device; to allow authenticated and authorized users to perform a remote operation on the at least one target device from the at least one of the one or more source devices using the generated pairing resource by providing secure authorization and authentication of devices sending remote commands. The source device may include any one or more of: a tablet, mobile phone, a laptop computer, a personal assistant and a home control device, that may be used for sending remote operation commands to the target device.

The pairing resource may comprise a "key seed", that is generated by the pairing service and sent to the at least one source device and that is securely stored on the one or more source devices; the key seed is also sent to the target device and securely stored on the target device. Both source device and target device use the same algorithm, known only to the source and the target device, to generate the symmetric key. The same key seed may also be shared with other source devices to allow pairing of those other source devices with the same target device. The symmetric key is used by the source device to encrypt a payload, which is then decrypted and verified by the target device using the symmetric key it generated during the pairing process. The target device may return a token during the pairing process that must be included in the encrypted payload by the source device and can be verified by the target device after decrypting the payload. The pairing resource may also comprise a public key of the public/private key pair generated by the source device, and shared with the target device via pairing service. Each source device generates a unique public/private key pair. The private key used by source device to sign the payload, which is verified by target device using the public key shared during the pairing process. In both symmetric (shared) secret and asymmetric secret use cases, the server is not aware of the secrets and hence cannot replay or impersonate the mobile device to perform operations. To securely generate shared secrets without exposing them to intermediate entities like server, the mobile device and the target device may implement an algorithm based on temporary asymmetric key pair and use that to securely share a symmetricSharedKey. For example, in an embodiment, 1. a server sends to TCU the pairingKeySeed and the Mobile Public Key; 2. the TCU produces RAND and symmetricPairingKey as HMAC(pairingKeySeed, RAND; 3. TCU encrypts secret using AES(RAND, MobilePublicKey) and send it to the pairing service which in return sends it to the mobile device; and 4. Mobile device decrypts RAND with its private key and compute the symmetricPairingKey similar to TCU. Other protocols that also generate a key, where the server is not aware of the algorithm used for key generation and hence would not have access to the generated keys, may also be used.

The system for authenticating a request, such as a request for a remote operation, from one or more source devices and sending a command to the at least one target device paired with such one or more source devices to carry out the requested command comprises at least one server, comprising a processor and a storage database, in which are stored the identities of authorized users, the identities of one or more source devices used by such users, and the identities of the at least one target device paired with such source devices; wherein the at least one server receives a pairing request from one or more source devices including device identifiers for the one or more source devices previously confirmed as paired with at least one target device as identified by a device identifier; and the at least one server, upon presentation by the at least one of the one or more source devices of the unique and secure pairing resource previously used for initial pairing and stored on the one or more source devices comprising the symmetric and/or asymmetric public/private key pair, sends a command to the at least one target device paired with that one or more source devices to perform the requested operation, such as a remote operation, and may return to the one or more source devices the results of the requested command. In an embodiment, a device may support both authorization and authentication, and use one or both to enforce stricter security depending on the use-case. For example, honk and flash may use only authorization, whereas remote engine start may enforce both authorization and authentication. However, in most cases where authentication (stricter) is used, authorization may not be necessary.

In an embodiment, the one or more servers that receive and process requests for operations may, upon receipt of a request for a remote operation from one or more paired source devices, query a real time database maintained by an operator of services to target devices for the status of the one or more target devices, such as whether the target device is in motion, and, depending on the status received, may deny an otherwise valid request from the one or more paired source devices if logic rules stored in the database require that the request be denied for a reason, such as a determination that carrying out the requested command could result in injury to the user of the target device or to others. For example, a vehicle in motion will reject a critical operation or certain critical operation may be made unavailable, e.g., greyed out, even when it receives the command from the paired device.

Additionally or alternatively, in an embodiment, if more than one source devices are paired with the target device, the target device may decide, based on the rules provided, which source device to accept command from by using methods such as current user verification. The current user verification may be based on parameters including any one or more of: which device is connected to radiofrequency transmitters and/or receivers, e.g., Bluetooth, login from the console, password authentication, presence of a particular key fob within a certain distance etc.

Additionally or alternatively, in an embodiment, the primary user may have to approve the secondary user when the secondary user requests pairing based on source device identifier, e.g., a text may be sent to the primary user for approval before adding another device as a paired device, or the primary user may have to accept/approve the pairing request from a secondary user by using interactive interface, e.g., a console in the vehicle HMI (Human Machine Interface) etc. In an embodiment, the primary user may control the access permissions to the secondary user based on who the secondary user is. For example, If the device requesting pairing belongs to wife, she may have more access permissions to the target device as opposed to the secondary use who is a child or a friend.

In yet another embodiment, when any one or more of the sources device is lost, stolen or exchanged, the user may be able to log into a portal provided by the device provider and/or the service provider and delete that device from the server. A new device may be added as illustrated in the figures and described in the description accompanying the figures.

As illustrated in FIG. 1A, the system for pairing a mobile device with an IoT device includes one or more mobile devices 106, 108 which act as transmitting devices/source devices, an IoT device 110 and/or 112, which acts as a receiving/target device and a backend system.

The backend system 102 may be maintained by the original equipment manufacturer (OEM) or a third party responsible for maintaining the backend system. The backend system 102 may include components such as a pairing service 104 including a server including a processor; a storage database 114; and a memory working in concert with the processor and storage database, also known as secure storage 114; and a user interface. The server may be a virtual server, for example, a cloud server, or a physical server, which may be local or remote server. The user interface may be provided by any one or more of: a pairing application on mobile or other source device 1 118, a pairing application on mobile or other source device 2 116, a HMI or head unit application in target car 1 122 and a HMI or head unit application in target car 2 120.

The pairing service 104 is responsible for orchestrating mobile and device pairing workflow. The pairing service 104 may also maintain record of all paired mobile or other source devices and IoT devices in the storage database 114. In an embodiment, the secret keys used for pairing that are shared between the pairing service and the mobile or other source devices and/or the IoT devices may be stored only on the mobile or other source device and/or on the target IoT devices to preserve privacy and confidentiality. Alternatively, or additionally, the shared key or the secret may be shared in the storage database of the pairing service. The user interface allows a user of the IoT device to pair the IoT device with one or more mobile devices, by providing identifiers of the devices to the pairing service 104.

As illustrated in FIG. 1A, the identifiers of the one or more IoT devices, e.g., CAR 1 110 and CAR 2 112, e.g., EID, MSISDN, IMSI, IMEI, MDN, ESN, VIN and the one or more mobile devices, e.g., Mobile 1 108 and mobile 2 106, e.g., EID, MSISDN, IMSI, IMEI, MDN, ESN, to be paired are provided to the pairing service 104 of the backend 102 via the user interface also known as head units or HMI 122 and/or 120 provided in CAR 1 110 and/or CAR 2 112. Alternatively, the one or more mobile devices may be paired with at least one of the one or more IoT devices, e.g., CAR 1 110 or CAR 2 112 via user interface 116 and/or 118 provided in mobile device 1 108 and/or mobile device 2 106.

Once the identifiers for the IoT as well as mobile devices are provided to the pairing service 104, the pairing service 104 generates pairingId and pairingKeySeed for Mobile1 108 and delivers to Mobile1 108 via step 1. Mobile1 108 generates Public/Private key pair and also generates symmetricsPairingKey from pairingKeySeed e.g., by using well known hashing algorithms like for example, SHA256, PDKDF2 etc. or custom algorithms. Submits Public Key to the pairing service. Stores keys in secure store via step 2. Pairing Service 104 sends pairingKeySeed and Mobile1 Public key to CAR1 110 step 3. CAR1 110 saves Mobile1 Public Key and generates symmetricsPairingKey from pairingKeySeed, e.g., by using well known hashing algorithms like for example, SHA256, PDKDF2 etc. or custom algorithms. The target device may also generate a token and submit to the pairing service 104 via step 4, which stores the keys in secure store 114.

In both symmetric (shared) secret and asymmetric secret use cases, the server is not aware of the secrets and hence cannot replay or impersonate the mobile device to perform operations. To securely generate shared secrets without exposing them to intermediate entities like server, the mobile device and the target device may implement an algorithm based on temporary asymmetric key pair and use that to securely share a symmetricSharedKey. For example, in an embodiment, 1. a server sends to TCU the pairingKeySeed and the Mobile Public Key; 2. the TCU produces RAND and symmetricPairingKey as HMAC(pairingKeySeed, RAND; 3. TCU encrypts secret using AES(RAND, MobilePublicKey) and send it to the pairing service which in return sends it to the mobile device; and 4. Mobile device decrypts RAND with its private key and compute the symmetricPairingKey similar to TCU. Other protocols that also generate a key, where the server is not aware of the algorithm used for key generation and hence would not have access to the generated keys, may also be used.

Pairing Service 104 generates pairingId and pairingKeySeed for Mobile2 106 and delivers to Mobile2 106 via step 5. Mobile2 106 generates Public/Private key pair and also generates pairingKey from pairingKeySeed, e.g., by using well known hashing algorithms like for example, SHA256, PDKDF2 etc. or custom algorithms. Submits Public Key to the pairing service 104 via step 5, which stores keys in secure store 114. Pairing Service sends pairingKeySeed and Mobile2 Public key to CAR2 via step 7. CAR2 saves Mobile2 Public Key and generates pairingKey from pairingKeySeed, e.g., by using well known hashing algorithms like for example, SHA256, PDKDF2 etc. or custom algorithms. The target device may also generate a token (ecuToken) and submit to the pairing service via step 8 which stores the keys in secure store 114. The ecuToken is transparent to the server. It is used by target device to verify & validate that the remote operation payload was constructed on the paired device.

After the completion of above workflow, the TCU on CAR1 110 would reject commands from Mobile2 106. It will accept commands only from the paired mobile i.e. Mobile1 108. Similarly, the TCU on CAR2 112 would reject commands from Mobile1 108. It will accept commands only from the paired mobile i.e. Mobile2 106, since only authorized and authenticated devices can send remote commands and/or remote commands sent only by authorized and authenticated devices may be performed. In an embodiment, only authorized and authenticated users can send remote commands using authorized and authenticated devices can send remote commands and/or remote commands sent only by authorized and authenticated users using authorized and authenticated devices may be performed.

In an embodiment, a trusted computer system is used for pairing one or more source devices with at least one target device. The system comprises at least one server comprising a processor, a secure storage database, one or more source devices and at least one target device. The server may be a virtual server, for example, a cloud server, or a physical server, which may be local or remote server. The server interacts with the one or more source devices and at least one target device by receiving device identifiers for the one or more source devices and the at least one target device, comparing these identifiers with trusted lists maintained in the computer system by the service provider, if the device identifiers are both included on the lists and identified as permitted to communicate with each other and in the indicated role (of the source device issuing a command to the target device), generating a unique, transitory and secure pairing resource for at least one of the one or more source devices and the at least one target device that allows authenticated and authorized users to issue a request for performance of a secure and authenticated remote operation on the at least one target device from the at least one of the one or more source devices that is paired and is authorized and authenticated, and allowing the service provider system to implement the requested remote operation when the correct generated pairing resource is presented with the request.

Figure 1B:
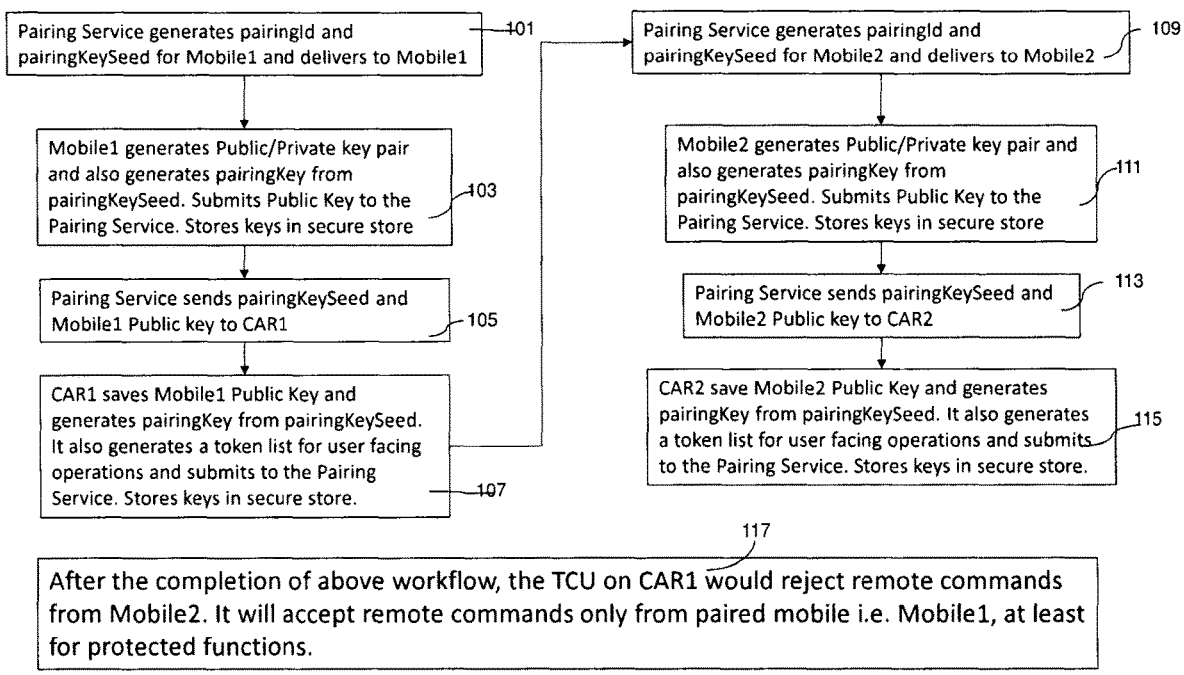
FIG. 1B illustrates an exemplary method of pairing source devices with IoT devices capable of receiving remote operation commands by providing secure authentication according to an embodiment described herein.

FIG. 1B illustrates an exemplary method of pairing mobile or other source device with IoT target devices using the system illustrated in FIG. 1A, according to an embodiment described herein.

In an embodiment, a computer implemented method for pairing one or more source devices with at least one target device, the method includes receiving device identifiers for the one or more source devices and the at least one target device; generating pairing resource for at least one of the one or more source devices and the at least one target device; and using the pairing resource to allow authenticated and authorized users to perform a remote operation on the at least one target device from the at least one of the one or more source devices. The method uses the system described in FIG. 1A including a server that maintains user and device identities and authorizes remote actions by receiving device identifiers for the one or more source devices and the at least one target device; validating the identity and authority of the one or more source devices; generating a secure and unique pairing resource for at least one of the one or more source devices and the at least one target device; confirming that the one or more source devices was authorized to access and act on the at least one target device and that the at least one target device confirmed the validity of the pairing resource provided and responded to the action of the one or more source devices; and thereafter using the pairing resource to allow authenticated and authorized users to perform a remote operation on the at least one target device from the at least one of the one or more source devices paired with that at least one target device.

As illustrated in FIG. 1B, the identifiers of the one or more IoT devices, e.g., CAR 1 and CAR 2, also known as receiving or target devices and the one or more mobile devices, e.g., Mobile 1 and mobile 2, also known as transmitting or source devices, to be paired are provided to the pairing service via the user interface provided on the IoT devices. Alternatively, the one or more mobile devices, e.g., Mobile 1 and mobile 2, also known as transmitting or source devices, may be paired with at least one of the one or more IoT devices, e.g., CAR 1 or CAR 2, also known as receiving or target devices, by providing their identifiers to the pairing service via the user interface provided on the mobile devices.

Once the identifiers for the IoT target device as well as the mobile or other source devices are provided to the pairing service, the pairing service generates pairingId and pairingKeySeed for Mobile1 and delivers to Mobile1 via step 101. Mobile1 generates Public/Private key pair and also generates pairingKey from pairingKeySeed, e.g., by using well known hashing algorithms like for example, SHA256, PDKDF2 etc. or custom algorithms, and submits Public Key to the pairing service, which stores the generated keys in secure store via step 103. In an embodiment, the secret key or the shared public key is saved only on the devices sharing that key, e.g., the target device or the vehicle and the transmitting device or the mobile. Pairing Service sends pairingKeySeed and Mobile1 Public key to CAR1 via step 105. CAR1 saves Mobile1 Public Key and generates pairingKey from pairingKeySeed. It also generates a token (ecuToken) and submits to the pairing service, which stores the generated keys in the secure store via step 107.

Pairing Service generates pairingId and pairingKeySeed for Mobile2 and delivers to Mobile2 via step 109. Mobile2 generates Public/Private key pair and also generates pairingKey from pairingKeySeed. Submits Public Key to the pairing service, which stores the keys in the secure store via step 111. Pairing Service sends pairingKeySeed and Mobile2 Public key to CAR2 via step 113. CAR2 save Mobile2 Public Key and generates pairingKey from pairingKeySeed. It also generates a token and submits to the pairing service, which stores the generated keys in secure store via step 115.

After the completion of above workflow, the TCU on CAR1 would reject commands from Mobile2. It will accept commands only from the paired mobile i.e. Mobile1 as shown by step 117. Similarly, the TCU on CAR2 would reject commands from Mobile1. It will accept commands only from the paired mobile i.e. Mobile2, since only authorized and authenticated devices can send remote commands and/or remote commands sent only by authorized and authenticated devices may be performed. In an embodiment, only authorized and authenticated users can send remote commands using authorized and authenticated devices can send remote commands and/or remote commands sent only by authorized and authenticated users using authorized and authenticated devices may be performed.

In an embodiment, only authorized and authenticated users can send remote commands using authorized and authenticated devices can send remote commands and/or remote commands sent only by authorized and authenticated users using authorized and authenticated devices may be performed, at least for certain remote operations also known as protected functions, for example, remote engine start/stop, remote door unlock etc. wherein performing those operations may result in hazardous situations.

In an embodiment, a computer implemented method for securely pairing one or more source devices with at least one target device includes a method for a network operator or other service provider who authenticates and implements methods for remote operation of IoT devices (referred to as "service provider") receiving device identifiers for the one or more source devices and the at least one target device; using lists of known and trusted device identifiers maintained by the service provider, a trusted computer system compares the device identifiers of the source and target devices received against the trusted lists to generate a unique and secure pairing resource for at least one of the one or more source devices and the at least one target device; authenticated and authorized users are allowed to use the secure pairing resource to generate a request for performance of a remote operation on the at least one target device from the at least one of the one or more source devices that is paired and is authenticated, and the service provider is allowed to implement the requested remote operation when that secure pairing resource is used. In an embodiment, the method for pairing one or more wireless mobile devices with IoT device uses a trusted and/or secure computer/server system for securely pairing one or more source devices with at least one target device uses the system illustrated in FIG. 1A and described in the description accompanying FIG. 1A.

In an embodiment, the one or more servers that receive and process requests for operations may, upon receipt of a request for a remote operation from one or more paired source devices, query a real time database maintained by an operator of services to target devices for the status of the one or more target devices, such as whether the target device is in motion, and, depending on the status received, may deny an otherwise valid request from the one or more paired source devices if logic rules stored in the database require that the request be denied for a reason, such as a determination that carrying out the requested command could result in injury to the user of the target device or to others. For example, a vehicle in motion will reject a critical operation or certain critical operation may be made unavailable, e.g., greyed out, even when it receives the command from the paired device.

Additionally or alternatively, in an embodiment, if more than one source devices are paired with the target device, the target device may decide, based on the rules provided, which source device to accept command from by using methods such as current user verification. The current user verification may be based on parameters including any one or more of: which device is connected to radiofrequency transmitters and/or receivers, e.g., Bluetooth, login from the console, password authentication, presence of a particular key fob within a certain distance.

Additionally or alternatively, in an embodiment, the primary user may have to approve the secondary user when the secondary user requests pairing based on source device identifier, e.g., a text may be sent to the primary user for approval before adding another device as a paired device, or the primary user may have to accept/approve the pairing request from a secondary user by using interactive interface, e.g., a console in the vehicle TCU, etc. In an embodiment, the primary user may control the access permissions to the secondary user based on who the secondary user is. For example, If the device requesting pairing belongs to wife, she may have more access permissions to the target device as opposed to the secondary use who is a child or a friend.

In yet another embodiment, when any one or more of the source device is lost, stolen or exchanged, the user may be able to log into a portal provided by the device provider and/or the service provider and delete that device from the server. A new device may be added as illustrated in the figures and described in the description accompanying the figures.

Figure 2B:
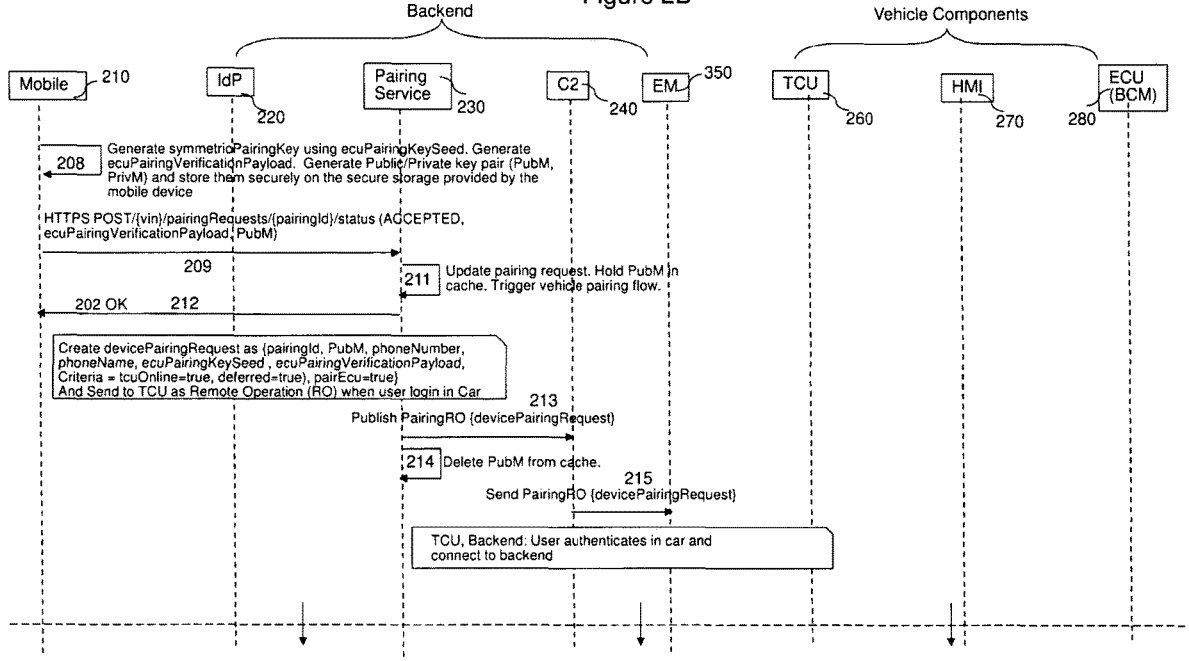

The flowcharts illustrated in FIGS. 2A, 2B and 2C describe a process to generate a shared key or a public/private key pair. This generated shared key is used to encrypt/decrypt operation payload to allow only authenticated users that are also authorized to perform the operation from any authorized source device. Whereas, the public/private key pair is used to sign and validate the payload allows only authenticated users that are authorized to perform the operation from a specific authorized source device.

Figure 3B:
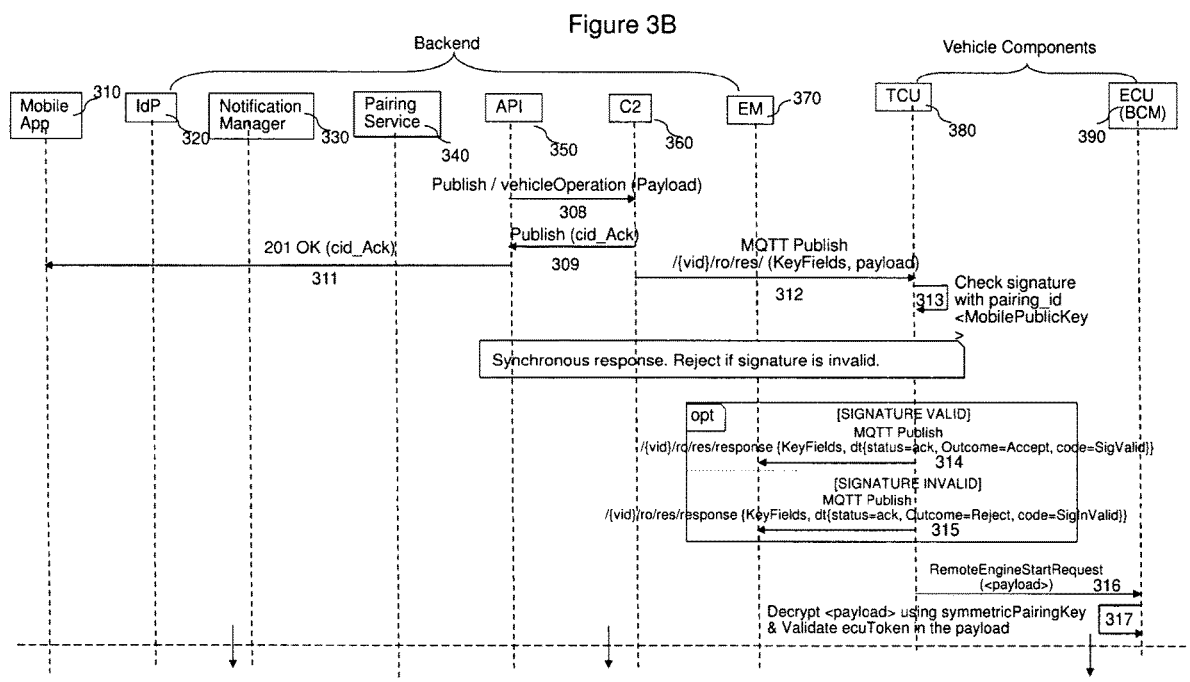
Figure 3C:
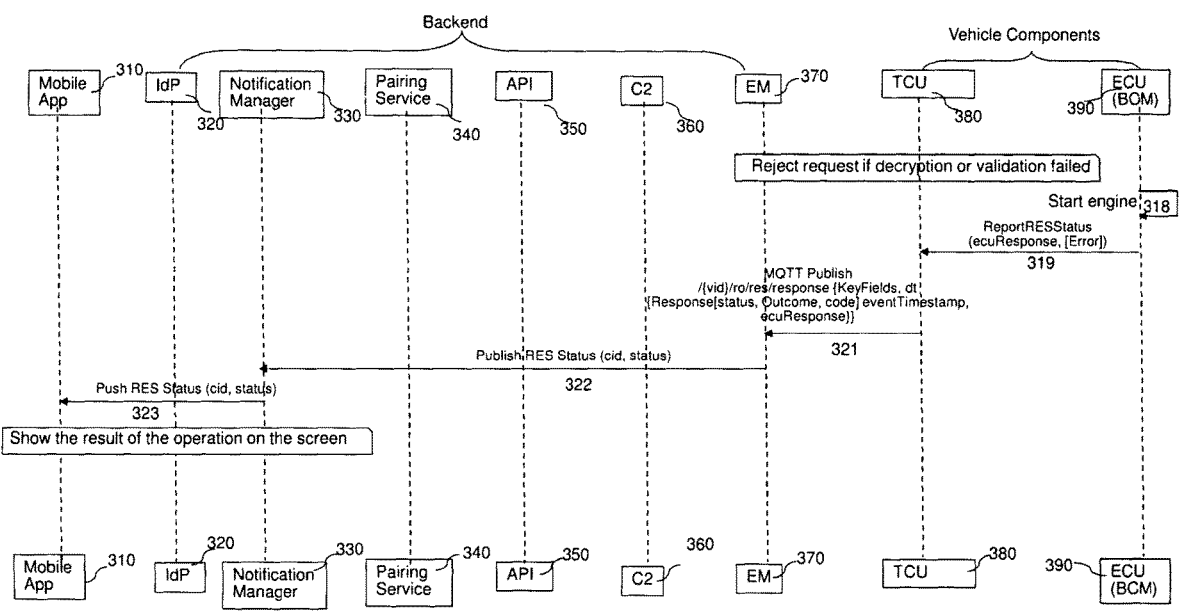

Detailed process flow for pairing mobile phone with IoT devices for the method described above is illustrated in FIGS. 2A, 2B and 2C and described below, and detailed process flow for performing remote operations using paired mobile phone with IoT devices is illustrated in FIGS. 3A, 3B and 3C and described below.

FIGS. 2A, 2B and 2C illustrate an exemplary process for pairing mobile phone with IoT devices according to an embodiment described herein. The process flow illustrated in FIGS. 2A, 2B and 2C uses the components including a mobile device 210; back end system components including IdP 220, pairing service 230, C2 240, EM 250; and vehicle components including TCU 260, HMI 270, and ECU (for example, BCM in this case) 280.

Upon first launch of the application on the mobile or other source device, such as a mobile application or a web application, the application generates mobile app Id (UUID) and stores it in secure persistent storage of the backend system, which is then used by the backend system to uniquely identify the user's mobile device 210. The authentication of the mobile device user is performed by sending HTTPS POST/auth (username, password) to IdP via step 201, which in turn responds as 201 OK (AT) via step 201. Pairing service 230 then checks if the mobile device 210 is paired with the vehicle by checking with the pairing service using command HTTPS GET/pairing requests ({userId}, {mobileAppId}, {VIN}, {PhoneName}) via step 203. The pairing service 230 may respond as 201 OK or 404 not found via step 204 depending on whether the mobile device 210 is paired or not. Other device identifiers for each device, e.g., ED, MSISDN, IMSI, IMEI, MDN, ESN, VIN may also be used. Thus, pairing of wireless mobile device with IoT device also known as Mobile-Device Pairing described herein refers to a cloud mediated pairing process to allow remote operations to be performed securely where the remote commands are also sent over cloud, providing a different approach from current technologies that use near field communication (NFC), for example, peer to peer (P2P) network used for exchanging data etc.

If the vehicle is not paired, the mobile app may prompt the user to pair his/her mobile phone with the vehicle. It may be done by requesting pairing as HTTPS POST/pairing requests (VIN, phone number/mobile ID/name, UserID) via step 205, the pairing service 230 may store the request, assign unique pairing ID, and generate a unique nonce (ecuPairingKeySeed) per target device, encrypts key with <VID> and store in the storage database via step 206 and respond as 200 OK. The pairing request may have Time-To-Live (TTL) before which the request must be completed. The length of nonce may vary based on the cryptography and resource capabilities of the source and target device. For resource, for example, memory, constrained devices like microcontrollers, smaller keys can be used.

The mobile device 210 may then generate pairing Key using ecuPairingKeySeed, e.g., by using well known hashing algorithms like for example, SHA256, PDKDF2 etc. or custom algorithms, ecu Pairing VerificationPayload for target device to validate the ecuPairingKeySeed and the algorithm used to generate the pairing key and generating Public/Private key pair (PubM, PrivM) via step 208 and respond to the pairing service 230 via step 209 as HTTPS POST/{vin}/pairing Requests/{pairingId}/status (ACCEPTED, ecu Pairing VerificationPayload, PubM). The ecu Pairing Verification Payload is computed by the mobile device 210 so that the target device, for example, vehicle ECU 280 can verify & validate that mobile device 210 is using the same algorithm and secret to generate the symmetricPairingKey. The algorithm to compute ecuPairingVerificationPayload is known only to the source/mobile device 210 and the target device. Following is one example of how the ecuPairingVerificationPayload may be computed. Other similar methods can be used as well.
ecuPairingVerificationPayload=TEA(symmetricPairingKey, <VIN>)||TEA(symmetricPairingKey, <EpochTimestamp>)

This generated shared key (symmetricPairingKey) is used to encrypt/decrypt operation payload to allow only authenticated users that are also authorized to perform the operation from any authorized source/mobile device 210. Whereas, the public/private key pair is used to sign and validate the payload allows only authenticated users that are authorized to perform the operation from a specific authorized source/mobile device 210.

The pairing service 230 may then update the pairing request, hold public key (PubM) in cache and trigger vehicle pairing flow via step 211 and respond to the mobile device 210 as 202 OK via step 212.

The pairing service 230 sends devicePairing Request={pairingId, PubM, phoneNumber, phoneName, ecuPairingVerificationPayload, Criteria=tcuOnline=true, deferred=true), pairEcu=true} and requests pairing remote operations as PairingRO {devicePairingRequest} to C2 240 via step 213 and deletes PubM from cache via step 214. C2 240 sends PairingRO {devicePairingRequest} to EM 250 via step 215.

The vehicle may authenticate the user while present in the car either by asking the user to enter username/password in the HMI, or may use presence of Bluetooth paired mobile device or key fob or any other means supported by the vehicle, to identify or authenticate the user. Once the user is authenticated, TCU 260 notifies EM 250 via MQTT Publish /{vin}/tcuconnectivity via step 216. The EM 250 responds by MQTT Publish /{vin}/ro/devicepairing/request via step 217. The TCU 260 stores Device Pairing Request Payload locally with TTL against pairing_Id, and PubM against pairing_Id via step 218; and requests a show pairing request with phoneName and phoneNumber on HMI 270 via step 219. The HMI 270 responds by displaying User confirmation (ACCEPTED/DECLINED) on the TCU 260, and sends Pair Mobile to ECU (for example, BCM in this case) 280 via step 221 or optionally pairs mobile with ECU via step 222. The ECU (for example, BCM in this case) 280 generates pairing key and verifies ecu Pairing Verification Payload to generate token via step 223.

Thus step 223 may generate a shared key and/or a public/private key pair. This generated shared key may be used to encrypt/decrypt operation payload to allow only authenticated users that are also authorized can be perform the operation from any authorized source device. Whereas, the public/private key pair is used to sign and validate the payload allows only authenticated users that are authorized can be perform the operation from a specific authorized source device.

Once generated, and matched, the ECU (for example, BCM in this case) 280 sends OK message with token, and an error message is sent if matching fails via step 224. The TCU 260 then deletes locally stored DevicePairing Request by pairing_id via step 225 and sends a response to the pairing service 230 as MQTT Publish /{vin}/ro/devicepairingkey/response via step 226. The pairing service 230 the updates the status of the pairing request as accepted or declined or error, e.g., (pairing_id, token, status (ACCEPTED/DECLINED), [Error]), via step 227.

Once the source device, e.g., a mobile phone, is paired with the IoT target device, e.g., a vehicle, it can send remote commands to the vehicle for the vehicle to be acted upon. The process flow described below illustrates a process for making sure that the remote command received by the vehicle is sent by the paired mobile phone only.

FIGS. 3A, 3B and 3C illustrate an exemplary process for performing remote operations using a paired mobile or other source device with IoT target devices according to an embodiment described herein. The process flow illustrated in FIGS. 3A, 3B and 3C uses the components including a mobile application 310; back end system components including IdP 320, notification manager 330, pairing service 340, API 350. C2 360, EM 370; and vehicle components including TCU 380, BCM 390.

When the application 310 in launched to send a remote command, the source device from which the application is launched is authenticated by HTTPS POST/auth (username, password) via step 301 and if authenticated, the source device is connected to API 350. Once the user is authenticated via steps 302 and 303, the user is ready to perform a remote start operation and may click on a button to do so. The application 310 contacts pairing service 340 to GET /{vin}/res/token via step 304 for remote engine start (res), upon receipt of which, the pairing service 340 fetches the token associated with RES operation from database 305 and sends the OK (ecuToken) to the application 310 via step 306. The application 310 is then prompted for a PIN which may be a secure PIN which is then validated by sending vehicleOperation (Payload) to API 350 via step 307. The payload may be computed as follows:

let p1=concat (ecuToken, timestamp)
    let p2=concat (p1, checksum (p1))
    let p3=encrypt (p2, pairingKey), pairing Id
    let p4=p3, sign(p3, <MobilePrivateKey>)
    p4 will appear as one of the field in the RO JSON payload.
E.g.,

```
{
vehicleId:,
operation: "res",
requestTimestamp:,
userAgent:'
```

-continued

```
data:{
    authPayload: <p4>,
    PairingId:
    }
}
```

The command to remotely start the engine is then sent from API 350 to C2 360 as Publish/vehicleOperation (Payload) via step 308. The application 310 may be a web-based application or a mobile application.

As described earlier, the shared key and/or a public/private key pair are generated in step 223 of the process illustrated in FIGS. 2A, 2B and 2C. This generated shared key is used to encrypt/decrypt operation payload to allow only authenticated users that are also authorized to perform the operation from any authorized source device. Whereas, the public/private key pair used to sign and validate the payload allows only authenticated users that are authorized to perform the operation from a specific authorized source device. This process of validation using either the signature or the public/private key pair to allow only authenticated users that are authorized to perform the operation from a specific authorized source device is described below.

If the payload and metadata is valid, and the service is enabled and authorized for the vehicle, the C2 360 publishes (cid, ack) to the API via step 309 which is then relayed to the mobile application 310 via step 311. The C2 360 also sends MQTT Publish /{vid}/ro/res (the payload containing signature) to the vehicle TCU 380 which checks signatures against the stored pairing Id, or Mobile public key against stored pairing Id via step 313.

If the signature is valid, the TCU 380 responds by accepting the request via step 314, which in this case will result in responding to the remote operation (ro) remote engine start (res) by performing the requested remote operation as described below. If the signature is invalid, the TCU 380 responds by rejecting the outcome via step 315, which in this case will result in not responding to the remote operation (ro) remote engine start (res) by not performing the requested remote operation as described below. Although the remote operation illustrated here is remote engine start, other remote operations such as but not limited to remote engine stop, door lock/unlock (RDL) and other similar operations that may benefit from this additional security feature may also be performed using the system and process described herein.

If the signature is valid, the TCU 380 will send RemoteEngineStartRequest (<payload>) to ECU (for example, BCM in this case) 390 via step 316, which will then decrypt the payload using the shared key generated during the pairing process and validate token and timestamp via step 317. The request will be rejected if the decryption or validation fails. However, if the decryption and validation are successful, the ECU (for example, BCM in this case) 390 will start engine in response to the remote command via step 318. The validation and content of the payload may vary based on the ECU implementation and capabilities, and the operations being performed.

The response, start engine or error due to failed decryption and/or validation will be relayed to the TCU 380 via step 319 as ReportRESStatus (ecu Response, [Error]). The TCU 380 then sends the response to the EM 370 as MQTT Publish /{vid}/ro/res/response {KeyFields, dt {Response [status, Outcome, code] eventTimestamp, ecu Response}} via step 321, which then notifies the status of the remote command, e.g., remote start engine, to the notification manager 330 via step 322, which pushes it further to the mobile application 310 via step 323. Thus, pairing of wireless mobile device with IoT device also known as the Mobile-Device Pairing described herein not only refers to a cloud mediated pairing process but also allows remote operations to be performed securely where the remote commands are also sent over cloud, providing a different approach from current technologies that use near field communication (NFC), for example, peer to peer (P2P) network used for exchanging data. Although, the embodiments described herein and illustrated by FIGS. 3A, 3B and 3C refer to remote engine start, other remote operations including but not limited to remote engine off, remote door lock/unlock etc. may also be performed similarly.

Figure 4:
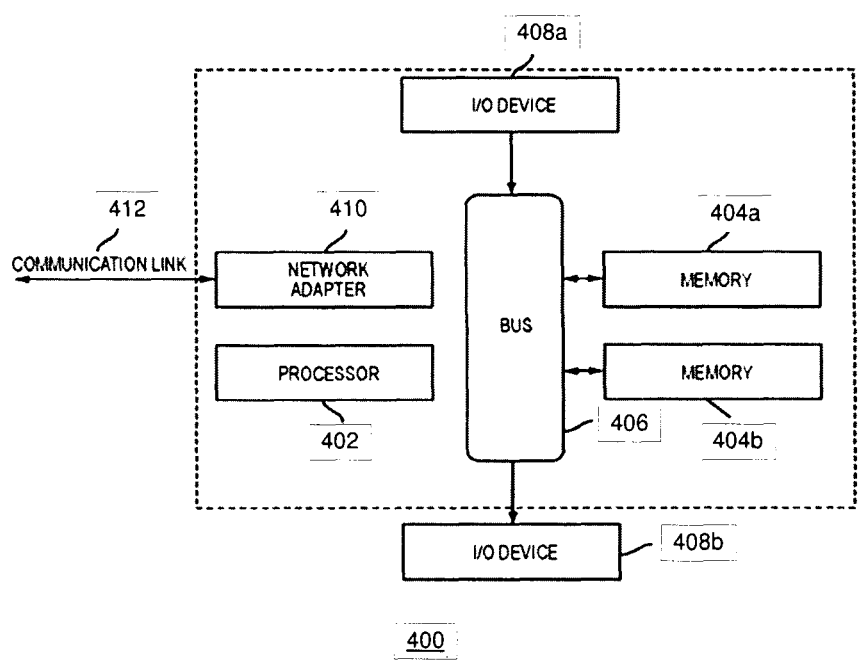
FIG. 4 illustrates a data processing system 400 suitable for storing the computer program product and/or executing program code relating to the pairing of source devices with IoT devices capable of receiving remote operation commands by providing secure authentication in accordance with an embodiment described herein.

FIG. 4 illustrates a data processing system 400 suitable for storing the computer program product and/or executing program code in accordance with an embodiment described herein. The computer program product stored on a non-transitory computer readable medium for pairing one or more source devices with at least one target device; the computer program product includes a processor, and a memory in communication with the processor wherein the memory containing program instructions which when executed by the processor, perform the following operations including receiving device identifiers for the one or more source devices and the at least one target device; generating pairing resource for at least one of the one or more source devices and the at least one target device; and using the pairing resource to allow authenticated and authorized users to perform a remote operation on the at least one target device from the at least one of the one or more source devices.

The data processing system 400 includes a processor 402 coupled to memory elements 404*a-b* through a system bus 406. In other embodiments, the data processing system 400 may include more than one processor and each processor may be coupled directly or indirectly to one or more memory elements through a system bus.

Memory elements 404*a-b* can include local memory employed during actual execution of the program code, bulk storage, and cache memories that provide temporary storage of at least some program code in order to reduce the number of times the code must be retrieved from bulk storage during execution. As shown, input/output or I/O devices 408*a-b* (including, but not limited to, keyboards, displays, pointing devices, etc.) are coupled to the data processing system 400. I/O devices 408*a-b* may be coupled to the data processing system 400 directly or indirectly through intervening I/O controllers (not shown).

In FIG. 4, a network adapter 410 is coupled to the data processing system 502 to enable data processing system 402 to become coupled to other data processing systems or remote printers or storage devices through communication link 412. Communication link 412 can be a private or public network. Modems, cable modems, and Ethernet cards are just a few of the currently available types of network adapters.

Embodiments of the process described herein can take the form of an software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for pairing one or more source devices with at least one target device, the method comprising:
   receiving device identifiers for the one or more source devices and the at least one target device;
   generating a pairing resource comprising a key seed for at least one of the one or more source devices and the at least one target device;
   using the pairing resource by the at least one of the one or more source devices and the at least one target device to generate pairing keys to pair the at least one of the one or more source devices; and
   allowing authenticated and authorized users to perform a remote operation on the at least one target device from the paired at least one of the one or more source devices.

2. The computer-implemented method of claim 1, wherein the at least one of the one or more source devices comprises a mobile phone capable of sending remote commands via cloud to the target device.

3. The computer-implemented method of claim 1, wherein the at least one target device is an IoT device capable of receiving remote commands via cloud from the one or more source devices.

4. The computer-implemented method of claim 1, wherein the device identifier for one or more source devices is any one or more of: EID, MSISDN, IMSI, IMEI, MDN, ESN.

5. The computer-implemented method of claim 1, wherein the device identifier for one or more target devices is any one or more of: EID, MSISDN, IMSI, IMEI, MDN, ESN, VIN.

6. The computer-implemented method of claim 1, wherein the pairing resource comprising the key seed is used to generate a symmetric key by the at least one of the one or more source devices and the at least one target device which is used to encrypt/decrypt operation payload.

7. The computer-implemented method of claim 1, wherein the pairing resource generated comprises a Public-Private key pair which is used to sign and validate operation payload.

8. The computer-implemented method of claim 6, wherein the symmetric key allows authenticated and authorized users to perform a remote operation on the at least one target device from any paired authorized source device.

9. The computer-implemented method of claim 6, wherein the symmetric key allows authenticated and authorized users to perform a protected remote operation on the at least one target device from a specific paired authorized source device.

10. A system for pairing one or more source devices with at least one target device, the system comprising at least one server comprising a processor, a storage database; one or more source devices; and at least one target device;

wherein the at least one server
receives device identifiers for the one or more source devices and the at least one target device, and
generates a pairing resource comprising a key seed for at least one of the one or more source devices and the at least one target device,
wherein the pairing resource is used by the at least one of the one or more source devices and the at least one target device to pair the at least one of the one or more source devices; and
allow authenticated and authorized users to perform a remote operation on the at least one target device from the paired at least one of the one or more source devices.

11. The system of claim 10, wherein the at least one of the one or more source devices comprises a mobile phone capable of sending remote commands via cloud to the target device.

12. The system of claim 10, wherein the at least one target device is an IoT device capable of receiving remote commands via cloud from the one or more source devices.

13. The system of claim 10, wherein the device identifier for one or more source devices is any one or more of: EID, MSISDN, IMSI, IMEI, MDN, ESN.

14. The system of claim 10, wherein the device identifier for one or more target devices is any one or more of: EID, MSISDN, IMSI, IMEI, MDN, ESN, VIN.

15. The system of claim 10, wherein the pairing resource comprising the key seed is used to generate a symmetric key by the at least one of the one or more source devices and the at least one target device which is used to encrypt/decrypt operation payload.

16. The system of claim 10, wherein the pairing resource generated comprises a Public-Private key pair which is used to sign and validate operation payload.

17. The system of claim 15, wherein the symmetric key allows authenticated and authorized users to perform a remote operation on the at least one target device from any paired authorized source device.

18. The system of claim 16, wherein the symmetric key allows authenticated and authorized users to perform a protected remote operation on the at least one target device from a specific paired authorized source device.

19. A computer program product stored on a non-transitory computer readable medium for pairing one or more source devices with at least one target device; the computer program product comprising:

a processor, and
a memory in communication with the processor wherein the memory containing program instructions which when executed by the processor, perform the following operations comprising:
receiving device identifiers for the one or more source devices and the at least one target device;
generating a pairing resource comprising a key seed for at least one of the one or more source devices and the at least one target device;
using the pairing resource by the at least one of the one or more source devices and the at least one target device to pair the at least one of the one or more source devices; and
allowing authenticated and authorized users to perform a remote operation on the at least one target device from the paired at least one of the one or more source devices.

20. The computer program product of claim 19, wherein the at least one of the one or more source devices comprises a mobile phone capable of sending remote commands via cloud to the target device.

21. The computer program product of claim 19, wherein the at least one target device is an IoT device capable of receiving remote commands via cloud from the one or more source devices.

22. The computer program product of claim 19, wherein the device identifier for one or more source devices is any one or more of: EID, MSISDN, IMSI, IMEI, MDN, ESN.

23. The computer program product of claim 19, wherein the device identifier for one or more target devices is any one or more of: EID, MSISDN, IMSI, IMEI, MDN, ESN, VIN.

24. The computer program product of claim 19, wherein the pairing resource comprising the key seed is used to generate a symmetric key by the at least one of the one or more source devices and the at least one target device which is used to encrypt/decrypt operation payload.

25. The computer program product of claim 19, wherein the pairing resource generated comprises a Public-Private key pair which is used to sign and validate operation payload.

26. The computer program product of claim 24, wherein the symmetric key allows authenticated and authorized users to perform a remote operation on the at least one target device from any paired authorized source device.

27. The computer program product of claim 25, wherein the symmetric key allows authenticated and authorized users to perform a protected remote operation on the at least one target device from a specific paired authorized source device.

* * * * *